(12) United States Patent
Mou

(10) Patent No.: US 6,216,952 B1
(45) Date of Patent: Apr. 17, 2001

(54) STRUCTURE OF A SCANNER

(75) Inventor: Michael Mou, Tu-Cheng (TW)

(73) Assignee: DBTEL Incorporated, Taipei (TW)

( * ) Notice: Subject to any disclaimer, the term of this patent is extended or adjusted under 35 U.S.C. 154(b) by 0 days.

(21) Appl. No.: 09/150,033

(22) Filed: Sep. 9, 1998

(51) Int. Cl.[7] .................................................. G06K 7/10
(52) U.S. Cl. ......................... 235/469; 235/455; 358/475
(58) Field of Search .................................. 358/475, 474, 358/497, 494, 487, 498; 73/401, 431; 178/7.1; 235/455, 469; 355/235; 250/559.3

(56) References Cited

U.S. PATENT DOCUMENTS

| | | | |
|---|---|---|---|
| 3,867,569 | * | 2/1975 | Watson .................................. 178/7.1 |
| 4,893,196 | * | 1/1990 | Koshiyouji et al. .................. 358/474 |
| 4,982,235 | * | 1/1991 | Fujino .................................. 355/235 |
| 5,231,513 | * | 7/1993 | Yokobori et al. ..................... 358/401 |
| 5,241,406 | * | 8/1993 | Johnston et al. ..................... 358/487 |
| 5,341,225 | * | 8/1994 | Stein et al. ............................ 358/498 |
| 5,606,173 | * | 2/1997 | Concannon et al. ............... 250/559.3 |
| 5,696,609 | * | 12/1997 | Cresens et al. ....................... 358/475 |
| 5,736,638 | * | 4/1998 | Wang et al. ............................ 73/431 |

FOREIGN PATENT DOCUMENTS 296 18 433 * 4/1998 (DE) ............................... H04N/1/10

* cited by examiner

Primary Examiner—Michael G. Lee
Assistant Examiner—J Yven
(74) Attorney, Agent, or Firm—Rosenberg, Klein & Lee

(57) ABSTRACT

A structure of a scanner includes a housing having a top provided with a glass window, a carriage mounted inside housing, the carriage including a a casing having a plurality of openings, a light source arranged within the casing for illuminating an object placed face down against the glass window above the carriage, and a plurality of mirrors fitted in the openings, whereby the scanner is compact in size and easy to assemble.

2 Claims, 5 Drawing Sheets

STRUCTURE OF A SCANNER

BACKGROUND OF THE INVENTION

1. Field of the Invention

This invention is related to an improved structure of a scanner and in particular one which is compact in size and easy to assemble.

2. Description of the Prior Art

It has been long desired to have a scanner which is compact in size and easy to assemble, but none of the scanners on the market are satisfactory in these areas. Referring to FIG. 1, the conventional scanner 1 generally includes a glass window 11 and a carriage 12. The carriage 12 includes a casing 121, a light source 122, a first mirror 123, a second mirror 124, a first mirror 123, a second mirror 124, a third mirror 125, a fourth mirror 126, a lens assembly 127, and a charge coupled device (CCD) 128. The casing 121 is formed with an opening 1211 and a piece of paper 13 is placed face down against the glass window 11 above the carriage 12.

As shown, the casing 121 is generally rectangular in shape, in which are arranged the light source 122, the mirrors 123–126, the lens assembly 127 and the charge coupled device 128. As the carriage 12 is moved beneath the page 13, the light source 122 illuminates the paper 13 and the carriage 12 captures light bounced off individual areas of the paper 13. Thereafter, the light from the paper 13 is reflected through the mirrors 123–126 to the lens assembly 127 which focuses the light onto the charge coupled device (CCD) 128 that translate the amount of light into an electrical current.

However, as shown in FIG. 1, the casing 121 is a closed rectangular member with only one opening 1211 at the top and so all component parts must be correctly arranged inside the casing 121 before it is closed. As a consequence, when required to adjust the component parts, it is necessary to open the casing 121 thereby causing much inconvenience in maintainence. In addition, since the mirrors 123–126 are mounted inside the casing 121, there must be fastening means for fixing the mirrors in place thus increasing the manufacturing cost.

Therefore, it is an object of the present invention to provide an improved structure of a scanner which can obviate and mitigate the above-mentioned drawbacks.

SUMMARY OF THE INVENTION

This invention is related to an improvement in the structure of a scanner.

It is the primary object of the present invention to provide an improved structure of a scanner which is compact in size and easy to assemble.

According to the present invention, a structure of a scanner includes a housing having a top provided with a glass window, a carriage mounted inside housing, the carriage including a casing having a plurality of openings, a light source arranged within the casing for illuminating an object placed face down against the glass window above the carriage, and a plurality of mirrors fitted in the openings.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
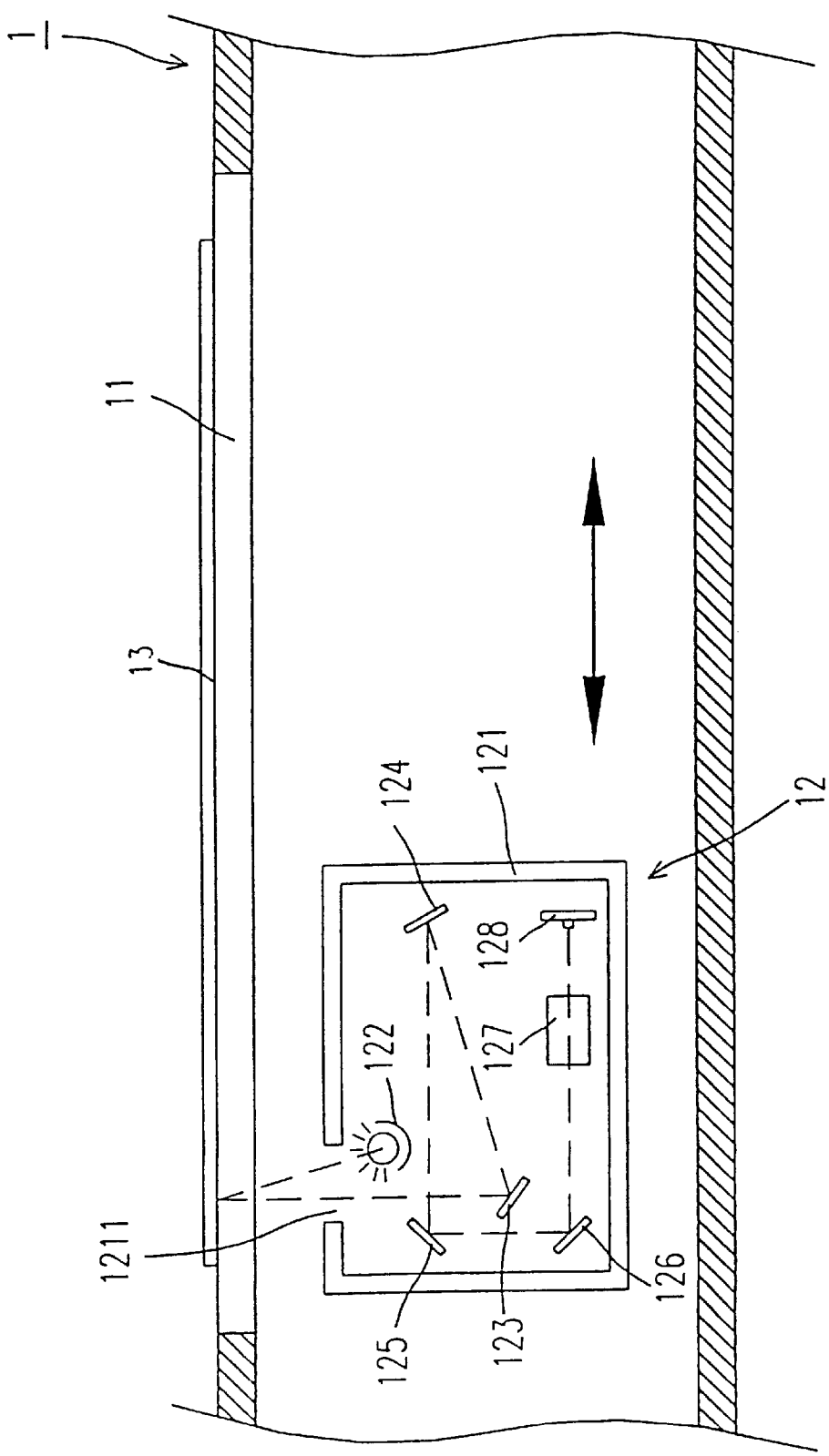
FIG. 1 is a sectional view of a prior art scanner.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
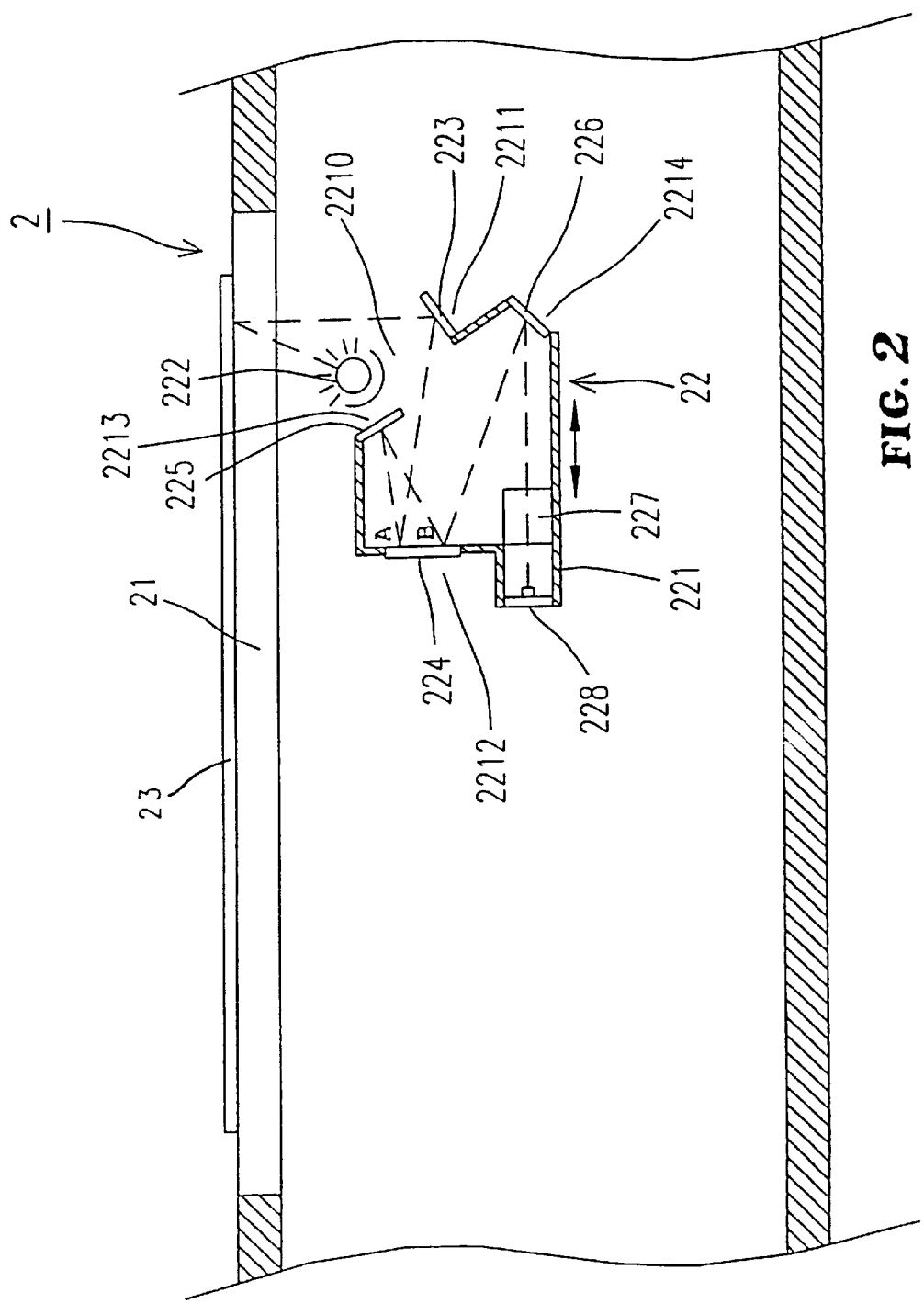
FIG. 2 is a sectional view of the carriage according to the present invention.

With reference to the drawings and in particular to FIG. 2 thereof, the scanner 2 according to the present invention comprises a housing having a glass window 21 at the top and a carriage 22 inside the housing. The carriage 22 generally includes a casing 221 having an opening 2210, a first hole 2211, a second hole 2212, a third hole 2213, a fourth hole 2214, a light source 222, a first mirror 223, a second mirror 224 having a first position A and a second position B, a third mirror 225, a fourth mirror 226, a lens 227, and a charge coupled device (CCD) 228. The light source 222 is provided with a convergent means such as a lampshade (shown but not numbered). A piece of paper 23 is placed face down against the glass window 21 above the carriage 22.

As shown in FIG. 2, the carriage 22 is driven by a motor (not shown). As the carriage 22 is moved beneath the page 23, the light source 222 illuminates the paper 23 and the carriage 22 captures light bounced off individual areas of the paper 23.

Then, the light from the paper 23 is reflected through the first mirror 223 to the first position A of the second mirror 224.

Thereafter, the light from the second mirror 224 is reflected to the third mirror 225.

The light from the third mirror 225 is reflected to the second position B of the second mirror 224.

Then, the light from the second mirror 224 is reflected to the fourth mirror 226.

Finally, the light from the fourth mirror 226 is reflected to the lens 227 which focuses the light onto the charge coupled device (CCD) 228 that translate the amount of light into an electrical current. The more light that is reflected, the higher the voltage of the current will be.

Figure 3:
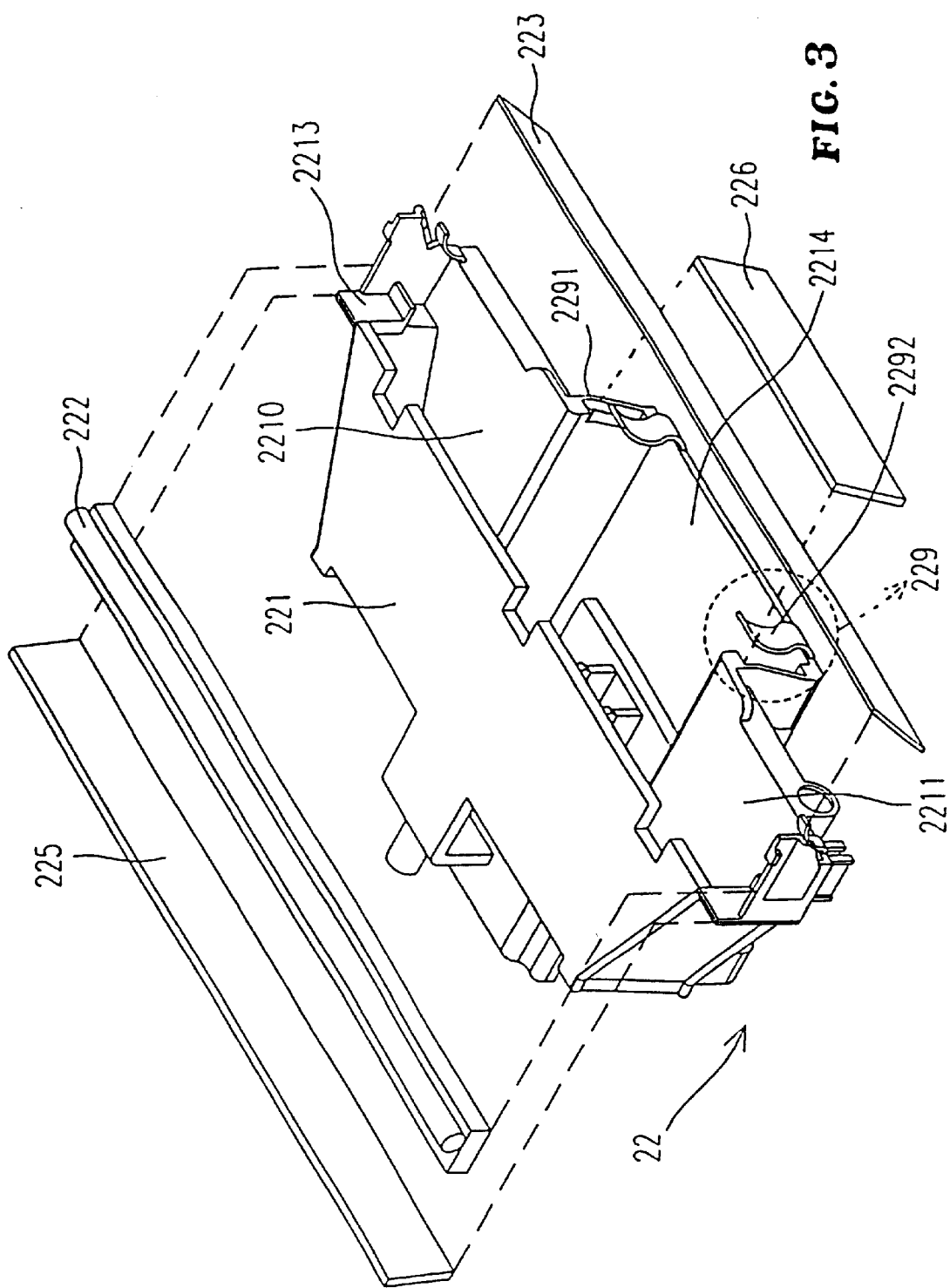
FIG. 3 is a top perspective view of the carriage according to the present invention.
Figure 4:
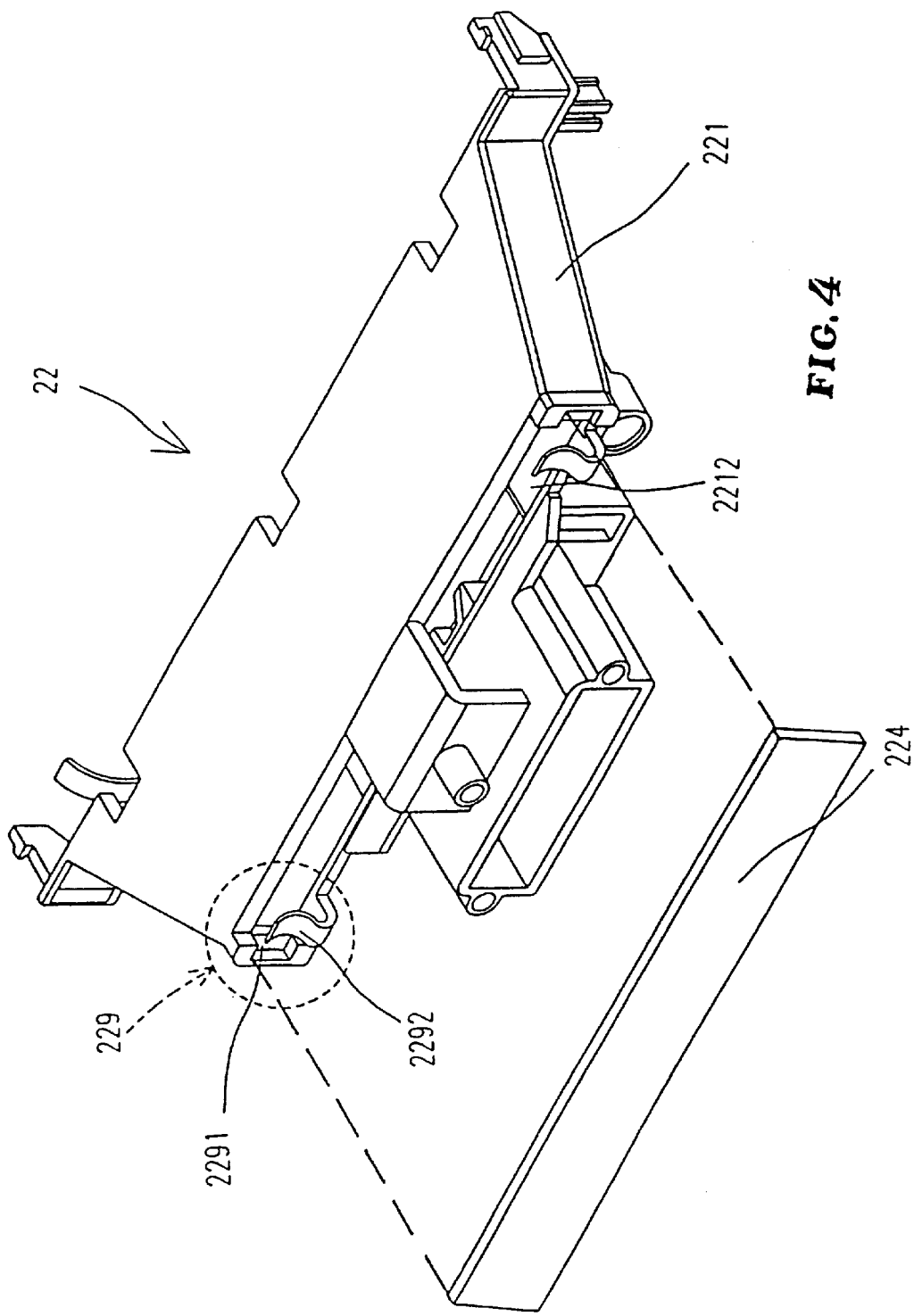
FIG. 4 is a left side perspective view of the carriage according to the present invention.
Figure 5:
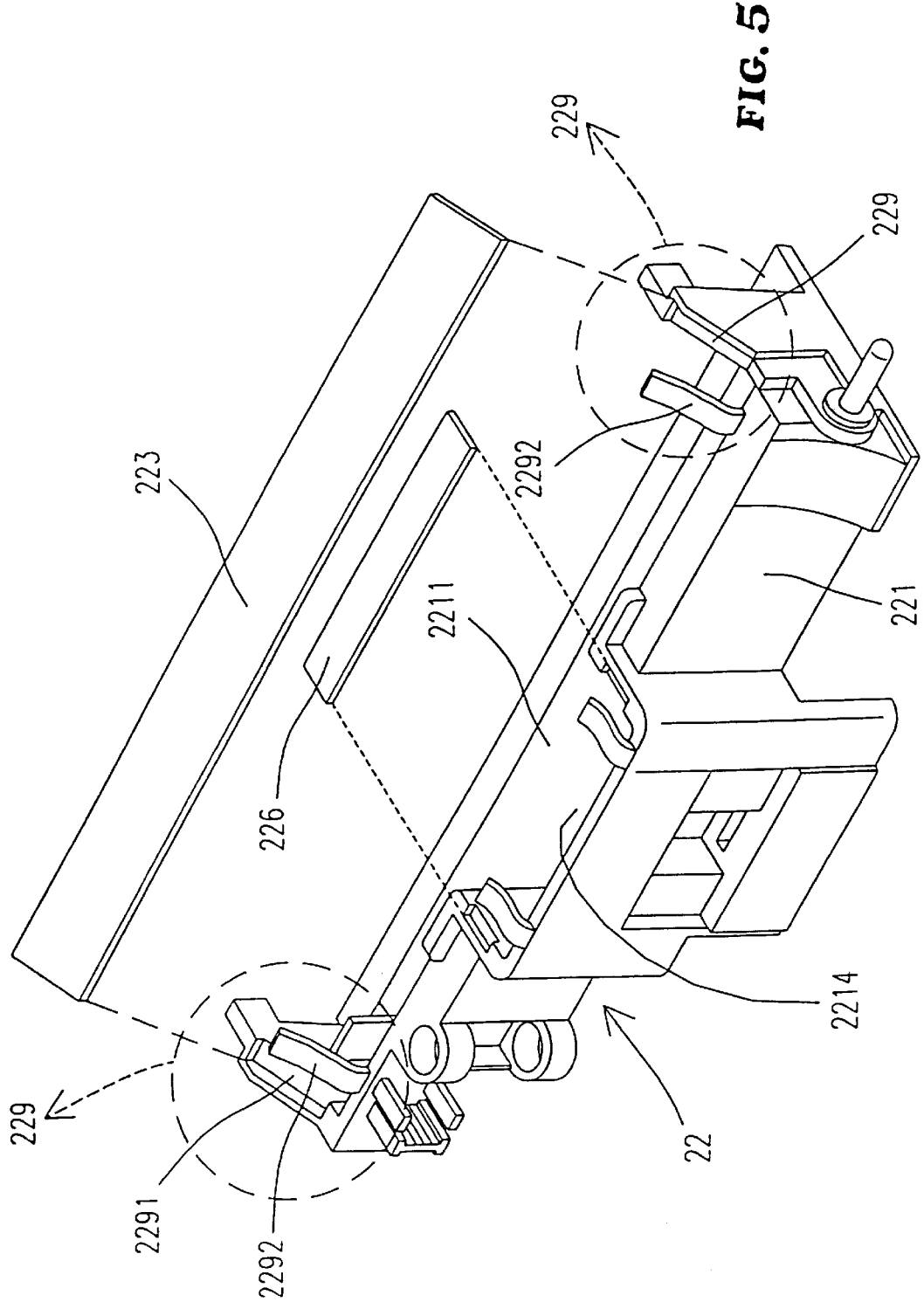
FIG. 5 is a perspective view illustrating how to mount the first mirror in the casing.

FIGS. 3, 4 and 5 illustrate different perspective views of the present invention. FIG. 3 is a perspective view of the present invention, looking from the top of FIG. 2. FIG. 4 is a top perspective view of the present invention, looking from the left side of FIG. 2. FIG. 5 is a perspective view of the present invention, illustrating how to mount the first mirror 223 in the casing 221.

Another feature of the present invention resides in that the mirrors 223–226 are respectively mounted on the openings 2211–2214 of the casing 221. In order to make clear the arrangement of the mirrors 223–226, the engaging structure 229 will now be described hereinafter with FIG. 5. FIG. 5 illustrates the carriage 22, the casing 221, the first hole 2211, the fourth hole 2214, and the engaging structure 229 with two recesses 2291 and two hooks 2292.

The first hole 2211 and the fourth hole 2214 are used for mounting the first mirror 223 and the fourth mirror 226. The casing 221 is formed with a second opening 2212 (see FIG. 4) for mounting the second mirror 224 and a third opening 2213 for mounting the third mirror 225. The opening 2211–2214 are each provided with an engaging structure 229 so that the mirrors 223–226 are movably mounted in the openings 2211–2214 thereby enabling the mirrors 223–226 to be fixed in place in one hand and facilitating the disassembly of the mirrors 223–226 in the other hand.

Referring to FIG. 5, each engaging structure 229 is provided with a recess 2291 and a hook 2292. When the mirror 223 can be inserted between the hooks 2291 and the casing 221 into the two recesses 2291, the hooks 2291 will bear against the mirror 223 thereby keeping the mirror 223 in the opening 221.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A structure of a scanner comprising:

a housing having a top provided with a glass window;

a carriage mounted inside said housing, said carriage including a casing having a plurality of openings;

a light source arranged within said casing for illuminating an object placed face down against said glass window above said carriage; and, a plurality of mirrors fitted in said plurality of openings, said plurality of mirrors including:

a first mirror fitted in a first one of said plurality of openings for reflecting light from the object;

a second mirror fitted in a second one of said plurality of openings and having a first position and a second position, said first position being for receiving light from said first mirror;

a third mirror fitted in a third one of said plurality of openings for receiving light from said first position of said second mirror and reflecting light to said second position of said second mirror; and a fourth mirror fitted in a fourth one of said plurality of openings for receiving light from said second position of said second mirror and reflecting light to an optical signal processing device.

2. The structure of a scanner as claimed in claim 1, wherein said processing device includes a lens assembly and a charge coupled device, said lens assembly receiving light from said fourth mirror and focusing said light onto said charge coupled device that translate said light into an elecrical current.

* * * * *